US009668265B2

(12) United States Patent
Palanki et al.

(10) Patent No.: US 9,668,265 B2
(45) Date of Patent: May 30, 2017

(54) TECHNIQUE FOR MITIGATING INTERFERENCE IN A CELLLAR WIRELESS COMMUNICATION NETWOK

(75) Inventors: Ravi Palanki, San Diego, CA (US); Aamod D. Khandekar, San Diego, CA (US); Avneesh Agrawal, San Diego, CA (US)

(73) Assignee: QUALCOMM Inc., San Diego, CA (US)

( * ) Notice: Subject to any disclaimer, the term of this patent is extended or adjusted under 35 U.S.C. 154(b) by 430 days.

(21) Appl. No.: 12/409,358

(22) Filed: Mar. 23, 2009

(65) Prior Publication Data

US 2009/0247181 A1    Oct. 1, 2009

Related U.S. Application Data

(60) Provisional application No. 61/040,347, filed on Mar. 28, 2008, provisional application No. 61/040,481, (Continued)

(51) Int. Cl.
*H04W 24/00* (2009.01)
*H04W 72/08* (2009.01)
(Continued)

(52) U.S. Cl.
CPC ......... *H04W 72/082* (2013.01); *H04L 1/0036* (2013.01); *H04W 52/243* (2013.01); *H04W 52/40* (2013.01)

(58) Field of Classification Search
CPC . H04W 52/243; H04W 52/40; H04W 72/082; H04L 1/0036
(Continued)

(56) References Cited

U.S. PATENT DOCUMENTS 5,513,379 A * 4/1996 Benveniste et al. .......... 455/451
6,327,468 B1 12/2001 Van Iersel et al.
(Continued)

FOREIGN PATENT DOCUMENTS

CA    2300067 A1    2/1999
CN    1510948 A     7/2004
(Continued)

OTHER PUBLICATIONS

"3rd Generation Partnership Project:Technical Specification Group Radio Access Network; Evolved UTRA and UTRAN;Radio Access Architecture and Interfaces (Release 7)" 3GPP Draft; TR_R3018_V_100, 3rd Generation Partnership Project (3GPP), Mobile Competence Centre ; 650, Route Des Lucioles ; F-06921 Sophia-Antipolis Cedex ; France, vol. RAN WG3, Oct. 12, 2007 (Oct. 12, 2007) , XP050143278 paragraph [6.12.5.1]-paragraph [6.12.5.3.5] figures 6.12.5.3.5-1.
(Continued)

*Primary Examiner* — Temica M Beamer
*Assistant Examiner* — Sayed T Zewari
(74) *Attorney, Agent, or Firm* — Paul Kuo

(57) ABSTRACT

Techniques for mitigating interference in a wireless communication network are described. A terminal may desire to communicate with a weaker serving base station and may observe high interference from a strong interfering base station. The two base stations may be asynchronous and have different frame timing. In an aspect, high interference may be mitigated by having the interfering base station reserve downlink and/or uplink resources. The interfering base station may transmit at a low power level or not at all on the reserved downlink resources to reduce interference to the terminal. Terminals served by the interfering base station may transmit at a low power level or not at all on the reserved uplink resources to reduce interference at the
(Continued)

serving base station. The terminal may then be able to communicate with the serving base station.

45 Claims, 11 Drawing Sheets

Related U.S. Application Data filed on Mar. 28, 2008, provisional application No. 61/076,366, filed on Jun. 27, 2008.

(51) Int. Cl.
- *H04L 1/00* (2006.01)
- *H04W 52/24* (2009.01)
- *H04W 52/40* (2009.01)

(58) Field of Classification Search
USPC .......................................... 455/452.2, 63.1
See application file for complete search history.

(56) References Cited

U.S. PATENT DOCUMENTS

| | | | |
|---|---|---|---|
| 7,047,016 | B2 | 5/2006 | Walton et al. |
| 7,058,030 | B2 | 6/2006 | Ekl et al. |
| 7,180,877 | B1 | 2/2007 | Benveniste |
| 7,349,504 | B2* | 3/2008 | Li et al. ............ 375/346 |
| 2003/0128679 | A1* | 7/2003 | Ishiguro ......... H04B 1/71052 370/335 |
| 2004/0106412 | A1 | 6/2004 | Laroia et al. |
| 2004/0176124 | A1 | 9/2004 | Gopalakrishnan et al. |
| 2006/0035641 | A1 | 2/2006 | Moon et al. |
| 2006/0193338 | A1 | 8/2006 | Zheng et al. |
| 2006/0203724 | A1 | 9/2006 | Ghosh et al. |
| 2006/0209721 | A1 | 9/2006 | Mese et al. |
| 2006/0250935 | A1 | 11/2006 | Hamamoto et al. |
| 2006/0280142 | A1 | 12/2006 | Damnjanovic et al. |
| 2007/0060057 | A1 | 3/2007 | Matsuo et al. |
| 2007/0070908 | A1 | 3/2007 | Ghosh et al. |
| 2007/0082619 | A1 | 4/2007 | Zhang et al. |
| 2007/0105574 | A1 | 5/2007 | Gupta et al. |
| 2007/0142067 | A1 | 6/2007 | Cheng et al. |
| 2007/0178928 | A1 | 8/2007 | Ode |
| 2007/0207828 | A1 | 9/2007 | Cheng et al. |
| 2007/0223611 | A1 | 9/2007 | Ode et al. |
| 2007/0242765 | A1 | 10/2007 | Parizhisky et al. |
| 2007/0248052 | A1* | 10/2007 | Nagaraj ............ H04B 1/71072 370/331 |
| 2008/0008147 | A1 | 1/2008 | Nakayama |
| 2008/0119155 | A1* | 5/2008 | Bobier .................. H04B 7/04 455/275 |
| 2008/0233967 | A1* | 9/2008 | Montojo ............ H04W 72/082 455/452.2 |
| 2009/0104908 | A1 | 4/2009 | Matsumoto et al. |
| 2009/0203320 | A1 | 8/2009 | Horn et al. |
| 2009/0247084 | A1 | 10/2009 | Palanki |
| 2009/0325626 | A1 | 12/2009 | Palanki et al. |
| 2011/0044222 | A1 | 2/2011 | Gerstenberger et al. |
| 2011/0081940 | A1 | 4/2011 | Gerstenberger et al. |
| 2015/0023259 | A1 | 1/2015 | Palanki et al. |

FOREIGN PATENT DOCUMENTS

| | | |
|---|---|---|
| CN | 1551525 A | 12/2004 |
| CN | 1989775 A | 6/2007 |
| EP | 0901299 A2 | 3/1999 |
| EP | 1455549 A1 | 9/2004 |
| EP | 1850612 A1 | 10/2007 |
| JP | 2001516166 A | 9/2001 |
| JP | 2003198502 A | 7/2003 |
| JP | 2004214754 A | 7/2004 |
| JP | 2005328519 A | 11/2005 |
| JP | 2006121641 A | 5/2006 |
| JP | 2006287601 A | 10/2006 |
| JP | 2007023787 A | 2/2007 |
| JP | 2007529915 A | 10/2007 |
| JP | 2007533224 A | 11/2007 |
| JP | 2008017325 A | 1/2008 |
| JP | 2011502093 A | 1/2011 |
| KR | 20060129219 A | 12/2006 |
| KR | 20070058683 A | 6/2007 |
| RU | 2142669 C1 | 12/1999 |
| RU | 2288538 C2 | 11/2006 |
| WO | 9428623 A1 | 12/1994 |
| WO | 9909699 A1 | 2/1999 |
| WO | WO9909667 A1 | 2/1999 |
| WO | 02093782 A1 | 11/2002 |
| WO | 03021903 A1 | 3/2003 |
| WO | WO2005062798 A2 | 7/2005 |
| WO | 2005101882 A1 | 10/2005 |
| WO | 2006046307 A1 | 5/2006 |
| WO | 2006096789 A1 | 9/2006 |
| WO | WO2006105308 A2 | 10/2006 |
| WO | 2006126616 A1 | 11/2006 |
| WO | 2007020958 A1 | 2/2007 |
| WO | WO2007022631 | 3/2007 |
| WO | WO2007024895 | 3/2007 |
| WO | WO2007044281 | 4/2007 |
| WO | 2008030823 A1 | 3/2008 |
| WO | WO2008093100 | 8/2008 |
| WO | WO2009009549 | 1/2009 |
| WO | WO2009035983 | 3/2009 |
| WO | WO2009039404 | 3/2009 |
| WO | WO2009043002 | 4/2009 |
| WO | WO2009064699 | 5/2009 |

OTHER PUBLICATIONS

Ericsson et al: "Text Proposal for DC-HSDPA assumptions and standards impact" 3GPP Draft; R1-082249 Text Proposal for DC-HSDPA Assumptions and Standards Impact, 3rd Generation Partnership Project (3GPP), Mobile Competence Centre; 650, Route Des Lucioles; F-06921 Sophia-Antipolis Cedex; France, vol. RAN WGI, No. Kansas City, USA; 20080523, May 23, 2008 (May 23, 2008), XP050110541, p. 8, paragraph 4.1-paragraph 4.2; p. 9, paragraph 4.3.1.

Huawei: "Component carrier structures", 3GPP Draft; R1-090814, 3rd Generation Partnership Project (3GPP) Mobile Competence Centre ; 650, Route Des Lucioles ; F-06921 Sophia-Antipolis Cedex ; France, No. Athens, Greece; 20090203, Feb. 3, 2009 (Feb. 3, 2009), XP050318671, [retrieved on Feb. 3, 2009].

International Search Report & Written Opinion—PCT/US2009/038519 ' International Search Authority-European Patent Office—Jul. 28, 2009.

Nokia et al: "L1 control signaling with carrier aggregation in LTE-Advanced", 3GPP Draft; R1-083730, 3rd Generation Partnership Project (3GPP), Mobile Competence Centre ; 650, Route Des Lucioles ; F-06921 Sophia-Antipolis Cedex ; France, No. Prague Czech Republic; 20080924, Sep. 24, 2008 (Sep. 24, 2008), XP050317069, [retrieved on Sep. 24, 2008].

Nokia Siemens Networks et al: "Primary Component Carrier Selection, Monitoring, and Recovery" 3GPP Draft; R1-090735_PRIMARYCCSELECT 3rd Generation Partnership Project (3GPP) Mobile Competence Centre; 650, Route Des Lucioles; F-06921 Sophia-Antipolis Cedex; France, No. Athens, Greece; 20090203, Feb. 3, 2009 (Feb. 3, 2009), XP050318599.

Nokia Siemens Networks et al: "Use of Background interference Matrix for Autonomous Component Carrier Selection for y LTE-Advanced" 3GPP Draft; RI-090235, 3rd Generation Partnership Project (3GPP), Mobile Competence Centre ; 650, Route Des Lucioles ; F-06921 Sophia-Antipolis Cedex ; France, No. Ljubljana; 20090107, Jan. 7, 2009 (Jan. 7, 2009), XP050318164 [retrieved on Jan. 7, 2009] the whole document.

Samsung: "Flexible Fractional Frequency-Reuse Approach" Internet Citation Nov. 7, 2005 (Nov. 7, 2005). XP002387571 Retrieved from the Internet URL:http://www.3gpp.org/ftp/tsg^ran/WGURL I/TSGRI_43/Docs/> [retrieved on 2006-06-73H: the whole document.

(56) References Cited

OTHER PUBLICATIONS

Taiwan Search Report—TW098110219—TIPO—Apr. 12, 2013.
Taiwan Search Report—TW098110219—TIPO—Aug. 10, 2012.
3rd Generation Partnership Project; "Technical Specification Group Radio Access Network "; Evolved UTRA and UTRAN; Radio Access Architecture and Interfaces (Release 7), 3GPP TR R3.018 V1.0.0 (Oct. 2007), R3-072027, pp. 1-137.
QUALCOMM Europe: "HNB and Macro Downlink Performance with Calibrated HNB Transmit Power" 3GPP Draft; R4-081344, 3rd Generation Partnership Project (3GPP), Mobile Competence Centre; 650, Route Des Lucioles; F-06921 Sophia-Antipolis Cedex; France, vol. RAN WG4, No. Munich, Germany; Jun. 10, 2008, Jun. 10, 2008 (Jun. 10, 2008), XP050179935 [retrieved on Jun. 10, 2008] paragraphs [0001], [0004], [0009].

\* cited by examiner

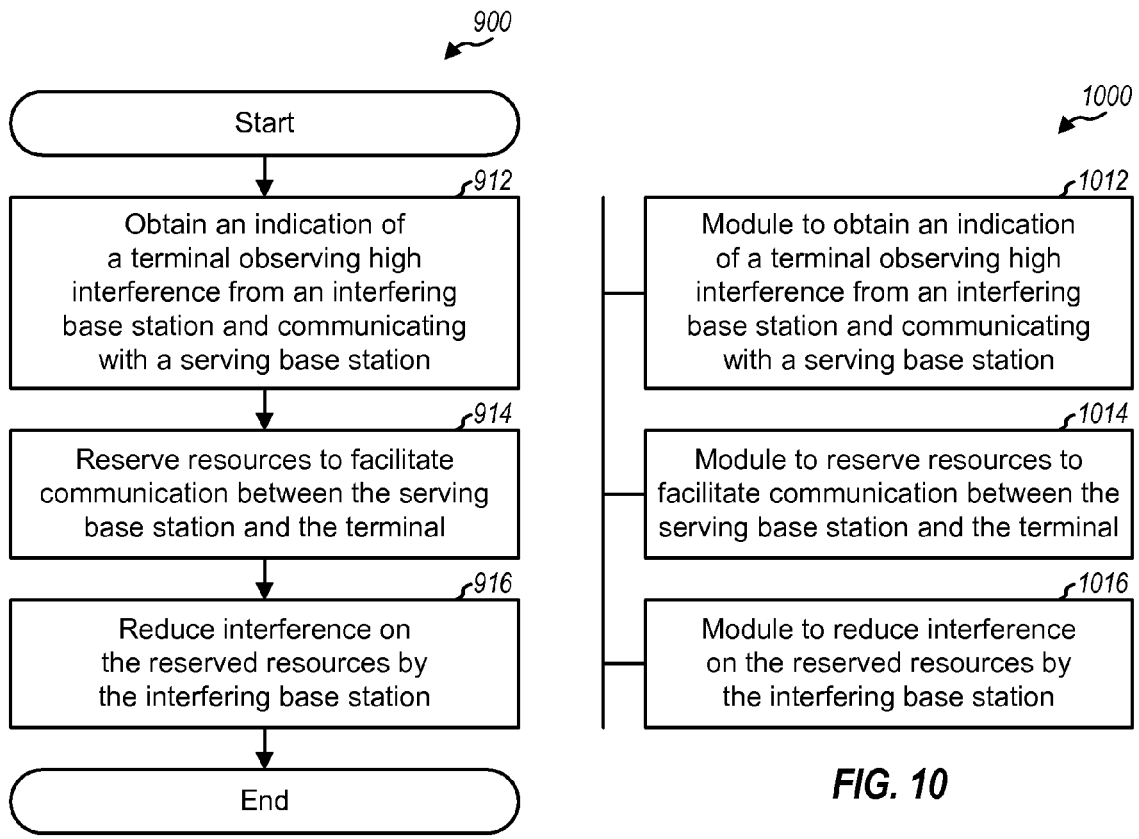
FIG. 9
FIG. 10
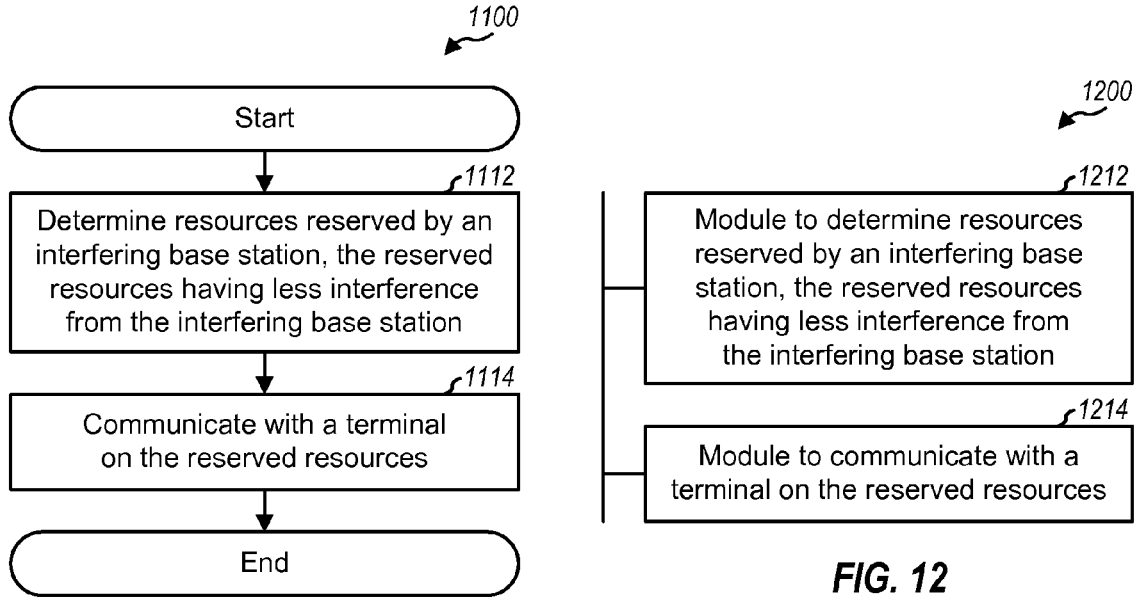
FIG. 11
FIG. 12

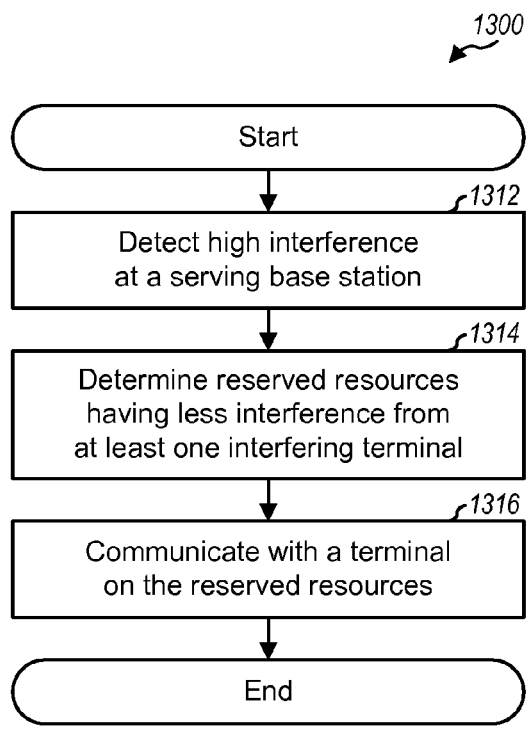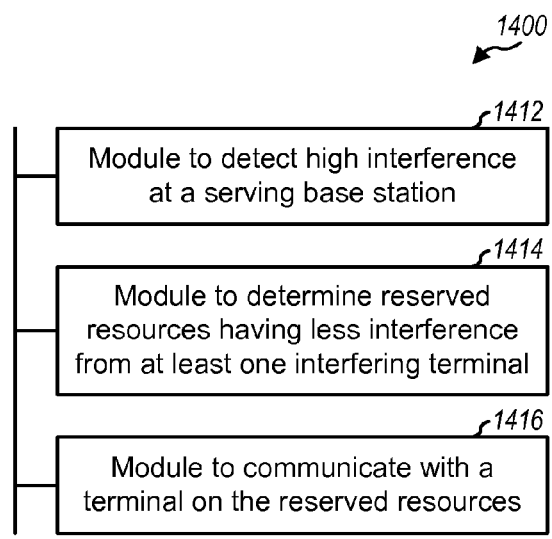
FIG. 13
FIG. 14

TECHNIQUE FOR MITIGATING INTERFERENCE IN A CELLLAR WIRELESS COMMUNICATION NETWOK

The present application claims priority to provisional U.S. Application Ser. No. 61/040,347, entitled "ASYNCHRONOUS LONG-TERM INTERFERENCE AVOIDANCE," filed Mar. 28, 2008, provisional U.S. Application Ser. No. 61/040,481, entitled "ASYNCHRONOUS SHORT-TERM INTERFERENCE AVOIDANCE," filed Mar. 28, 2008, and provisional U.S. Application Ser. No. 61/076,366, entitled "FLEXIBLE MULTICARRIER COMMUNICATION SYSTEM," filed Jun. 27, 2008, all assigned to the assignee hereof and incorporated herein by reference.

BACKGROUND

I. Field

The present disclosure relates generally to communication, and more specifically to techniques for mitigating interference in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of terminals. A terminal may communicate with a base station via the downlink and uplink. The downlink (or forward link) refers to the communication link from the base station to the terminal, and the uplink (or reverse link) refers to the communication link from the terminal to the base station.

A base station may transmit data on the downlink to a terminal and/or may receive data on the uplink from the terminal. On the downlink, a transmission from the base station may observe interference due to transmissions from neighbor base stations. On the uplink, a transmission from the terminal may observe interference due to transmissions from other terminals communicating with the neighbor base stations. For both the downlink and uplink, the interference due to interfering base stations and interfering terminals may degrade performance.

There is therefore a need in the art for techniques to mitigate interference in a wireless network.

SUMMARY

Techniques for mitigating interference in a wireless network are described herein. A terminal may desire to communicate with a weaker serving base station and may observe high interference from a strong interfering base station on the downlink. Furthermore, the serving base station may observe high interference from interfering terminals on the uplink. The serving base station and the interfering base station may be asynchronous and have different frame timing.

In an aspect, high interference on the downlink and/or uplink may be mitigated by having the interfering base station reserve some resources, e.g., frequency resources and/or time resources. The reserved resources may include reserved downlink resources and/or reserved uplink resources. The interfering base station may transmit at a low power level or not at all on the reserved downlink resources in order to reduce interference on the downlink to the terminal. Interfering terminals served by the interfering base station may transmit at a low power level or not at all on the reserved uplink resources in order to reduce interference on the uplink at the serving base station. The terminal may then be able to communicate with the serving base station in the presence of the interfering base station and its terminals. Reservation of frequency resources may be especially applicable for an asynchronous network. Reservation of time resources may avoid desensitization of a receiver at the terminal due to excessively high interference from the interfering base station, as described below.

Various aspects and features of the disclosure are described in further detail below.

BRIEF DESCRIPTION OF THE DRAWINGS

FIG. 9 shows a process performed by an interfering base station.
FIG. 10 shows an apparatus for an interfering base station.
FIG. 11 shows a process performed by a serving base station.
FIG. 12 shows an apparatus for a serving base station.
FIG. 13 shows another process performed by a serving base station.
FIG. 14 shows another apparatus for a serving base station.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
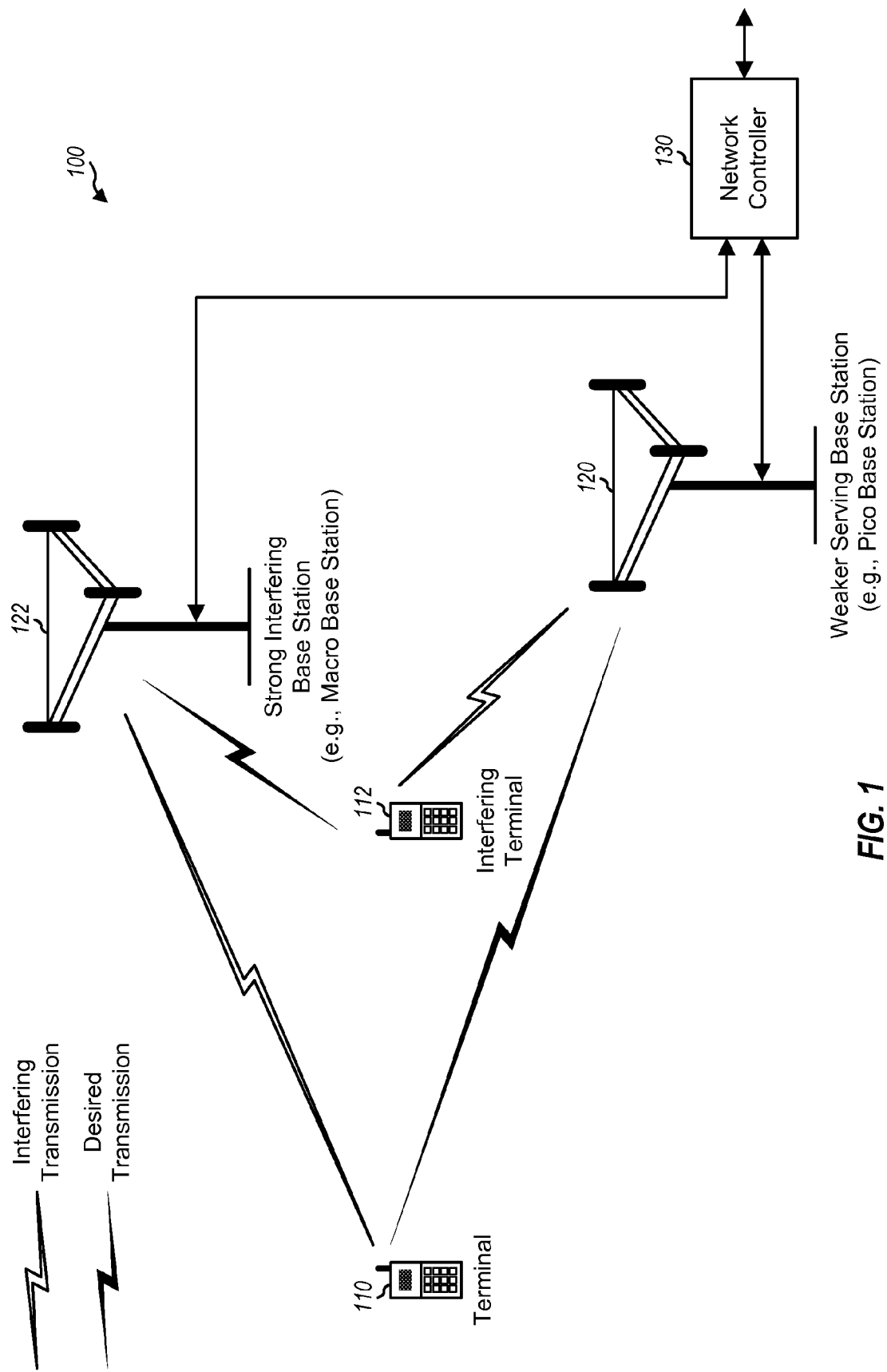
FIG. 1 shows a wireless communication network.

FIG. 1 shows a wireless communication network 100, which may include a number of base stations and other network entities. For simplicity, FIG. 1 shows only two base stations 120 and 122 and one network controller 130. A base station may be a station that communicates with the terminals and may also be referred to as an access point, a Node B, an evolved Node B (eNB), etc. A base station may provide communication coverage for a particular geographic area. The term "cell" can refer to a coverage area of a base station and/or a base station subsystem serving this coverage area, depending on the context in which the term is used.

A base station may provide communication coverage for a macro cell, a pico cell, a femto cell, and/or other types of cell. A macro cell may cover a relatively large geographic area (e.g., several kilometers in radius) and may allow unrestricted access by terminals with service subscription. A pico cell may cover a relatively small geographic area and may allow unrestricted access by terminals with service subscription. A femto cell may cover a relatively small geographic area (e.g., a home) and may allow restricted access by terminals having association with the femto cell, e.g., terminals belonging to a closed subscriber group (CSG). The CSG may include terminals for users in a home, terminals for users subscribing to a special service plan, etc. A base station for a macro cell may be referred to as a macro base station. A base station for a pico cell may be referred to as a pico base station. A base station for a femto cell may be referred to as a femto base station or a home base station.

Wireless network 100 may also include relay stations. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals.

Network controller 130 may couple to a set of base stations and provide coordination and control for these base stations. Network controller 130 may be a single network entity or a collection of network entities. Network controller 130 may communicate with base stations 120 and 122 via a backhaul. Base stations 120 and 122 may also communicate with one another, e.g., directly or indirectly via wireless or wireline backhaul.

Wireless network 100 may be a homogeneous network that includes only macro base stations. Wireless network 100 may also be a heterogeneous network that includes base stations of different types, e.g., macro base stations, pico base stations, home base stations, relay stations, etc. The techniques described herein may be used for homogeneous and heterogeneous networks.

Terminals 110 and 112 may be two of many terminals supported by wireless network 100. A terminal may be stationary or mobile and may also be referred to as an access terminal (AT), a mobile station (MS), a user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may be able to communicate with macro base stations, pico base stations, femto base stations, and/or other stations.

A terminal may communicate with a serving base station and may cause interference to and/or receive interference from one or more interfering base stations. A serving base station is a base station designated to serve a terminal on the downlink and/or uplink. An interfering base station is a base station causing interference to a terminal on the downlink and/or observing interference from the terminal on the uplink. In FIG. 1, base station 120 is a serving base station for terminal 110, and base station 122 is an interfering base station to terminal 110. Terminal 112 communicates with base station 122 and is an interfering terminal to base station 120.

Wireless network 100 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time.

Figure 2:
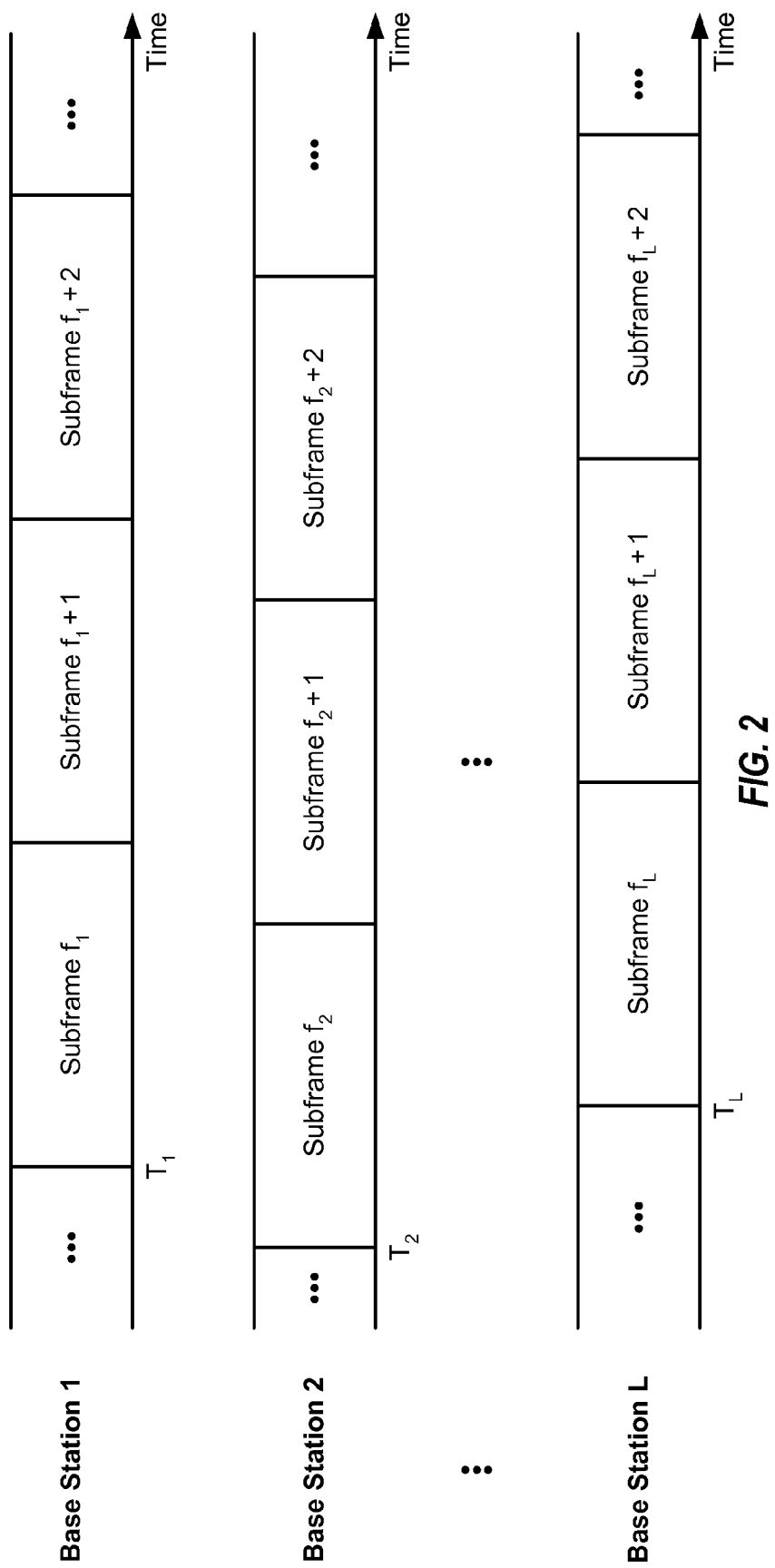
FIG. 2 shows asynchronous operation by multiple base stations.

FIG. 2 shows an example of asynchronous operation by multiple base stations 1 through L, where L>1. For each base station, the horizontal axis may represent time, and the vertical axis may represent frequency or transmit power. The transmission timeline for each base station may be partitioned into units of subframes. Each subframe may have a predetermined duration, e.g., 1 millisecond (ms), etc. A subframe may also be referred to as a slot, a frame, etc.

For asynchronous operation, each base station may independently maintain its frame timing and may autonomously assign indices to subframes. For example, base station 1 may have subframe $f_1$ starting at time $T_1$, base station 2 may have subframe $f_2$ starting at time $T_2$, etc., and base station L may have subframe $f_L$ starting at time $T_L$. The start times $T_1$, $T_2$, . . . , and $T_L$ may not be time aligned, as shown in FIG. 2. Furthermore, subframe indices $f_1$, $f_2$, . . . , and $f_L$ may have different values.

Wireless network 100 may utilize frequency division duplexing (FDD). For FDD, one frequency channel is allocated for the downlink, and another frequency channel is allocated for the uplink. The frequency channel for each link may be considered as frequency resources that may be used for transmission on that link. The frequency resources for each link may be partitioned in various manners.

Figure 3:
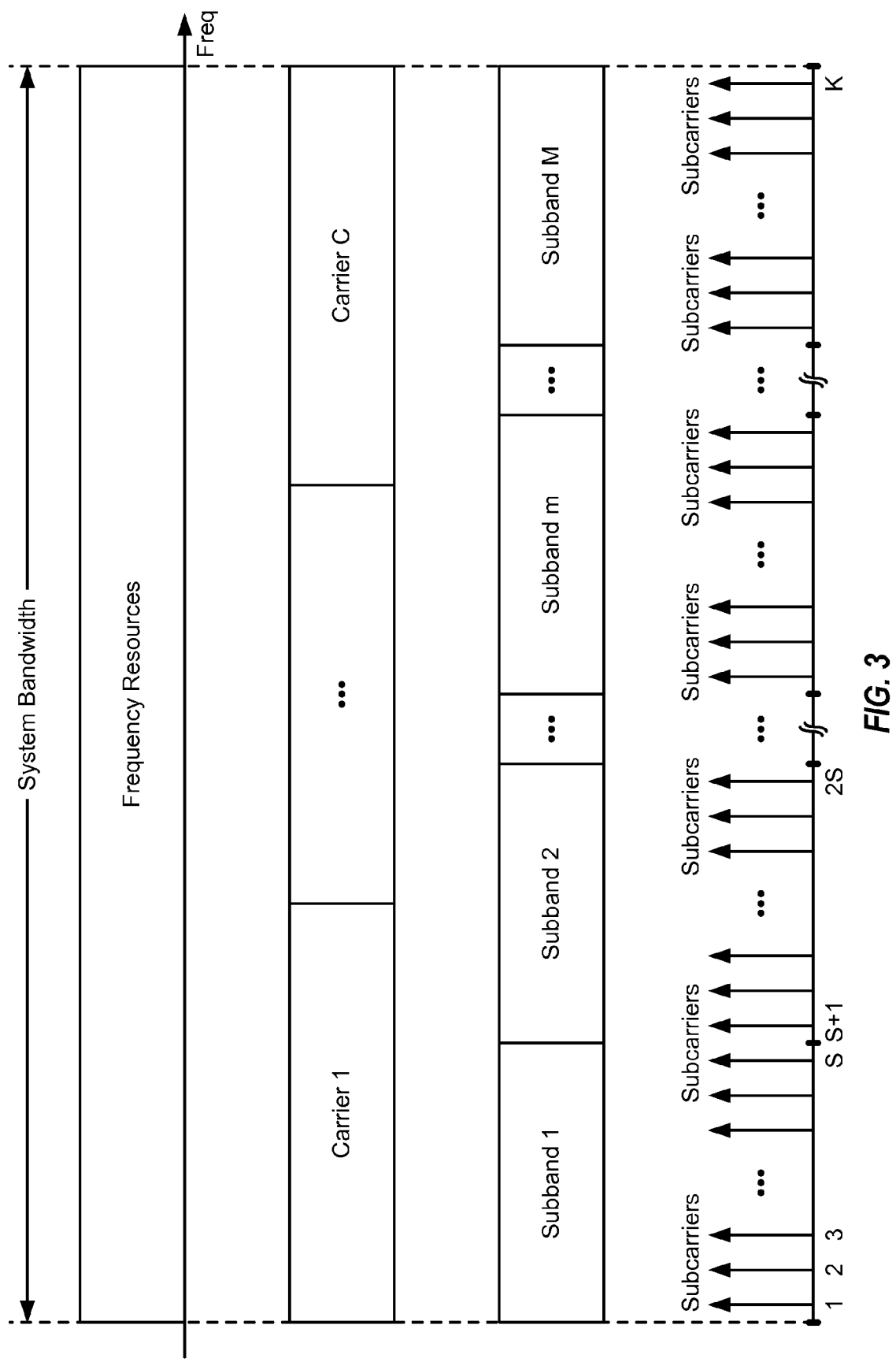
FIG. 3 shows partitioning of frequency resources.

FIG. 3 shows a design of partitioning frequency resources for one link, e.g., the downlink or uplink. The system bandwidth for the link may be fixed or configurable. For example, LTE and UMB support system bandwidth of 1.25, 2.5, 5, 10 or 20 megahertz (MHz). The system bandwidth may be partitioned into M subbands with indices of 1 through M, where M may be any value. Each subband may cover a predetermined frequency range, e.g., 1.08 MHz in LTE. The number of subbands may be dependent on the system bandwidth and the subband size. For example, 1, 2, 4, 8 or 16 subbands may be available for system bandwidth of 1.25, 2.5, 5, 10 or 20 MHz, respectively.

The system bandwidth may also be partitioned into multiple (K) subcarriers with orthogonal frequency division multiplexing (OFDM) or single-carrier frequency division multiplexing (SC-FDM). The subcarriers may also be referred to as tones, bins, etc. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively. Each subband may include S subcarriers, where S may be any value. For example, in LTE, each subband covers 1.08 MHz and includes 72 subcarriers.

The system bandwidth may also be partitioned into multiple (C) carriers. Each carrier may have a specific center frequency and a specific bandwidth. The number of carriers may be dependent on the system bandwidth and the carrier bandwidth size.

In general, the available frequency resources for each link may be partitioned in various manners, with subbands, subcarriers, and carriers being three examples. The available frequency resources may be allocated and used for transmission.

Wireless network 100 may include different types of base stations, e.g., macro base stations, pico base stations, femto base stations, etc. These different types of base stations may have different transmit power levels, different coverage areas, and different impact on interference in wireless network 100. For example, macro base stations may have a high transmit power level (e.g., 20 Watts) whereas pico and femto base stations may have a low transmit power level (e.g., 1 Watt).

Referring back to FIG. 1, terminal 110 may be within the coverage of multiple base stations. One of these base stations may be selected to serve terminal 110. The serving base station may be selected based on various criteria such as geometry, pathloss, etc. Geometry may be quantified by a signal-to-noise ratio (SNR), a signal-to-noise-and-interference ratio (SINR), a carrier-to-interference ratio (C/I), etc.

Terminal 110 may operate in a dominant interference scenario in which the terminal may observe high interference from one or more base stations and/or may cause high interference to one or more base stations. High interference may be quantified by the observed interference exceeding a threshold or based on some other criteria.

A dominant interference scenario may occur due to range extension, which is a scenario in which terminal 110 connects to a base station with lower pathloss and lower geometry among multiple base stations detected by terminal 110. For example, terminal 110 may detect base stations 120 and 122 and may have lower received power for base station 120 than base station 122. Nevertheless, it may be desirable for terminal 110 to connect to base station 120 if the pathloss for base station 120 is lower than the pathloss for base station 122. This may be the case if base station 120 (which may be a pico base station) has much lower transmit power as compared to base station 122 (which may be a macro base station). By having terminal 110 connect to base station 120 with lower pathloss, less interference may be caused to wireless network 100 to achieve a given data rate, and network capacity may be enhanced.

A dominant interference scenario may also occur due to restricted association. Terminal 110 may be close to base station 122 and may have high received power for base station 122. However, terminal 110 may not belong in a CSG of base station 122 and may not be allowed to access base station 122. Terminal 110 may then connect to unrestricted base station 120 with lower received power. Terminal 110 may then observe high interference from base station 122 and may also cause high interference to base station 122.

In an aspect, resource reservation may be used to support communication for terminal 110 operating in a dominant interference scenario. Resource reservation is reservation of certain resources by one base station for one or more other base stations. Resource reservation may also be referred to as resource allocation, "blanking", etc. Interfering base station 122 may reserve some downlink resources (e.g., one or more subbands for the downlink) on which base station 122 may transmit at a low power level or not at all in order to reduce interference on the reserved downlink resources. Interfering base station 122 may also reserve some uplink resources (e.g., one or more subbands for the uplink) on which terminals served by base station 122 may transmit at a low power level or not at all in order to reduce interference on the reserved uplink resources. Terminal 110 may then observe less interference on the reserved downlink resources, and serving base station 120 may observe less interference on the reserved uplink resources. Terminal 110 may then be able to communicate with serving base station 120 even in the presence of interfering base station 122 and its terminals. In general, the reserved resources may comprise frequency resources and/or time resources. For clarity, much of the description below is for reservation of frequency resources, or frequency reservation.

Frequency reservation may be used for both synchronous and asynchronous operations. Frequency reservation may be especially applicable for asynchronous operation since the base stations do not have a common notion of time. Asynchronous operation may become more common as more pico and femto base stations are deployed indoors, and these base stations may not have access to a synchronizing source such as Global Positioning System (GPS).

Figure 4:
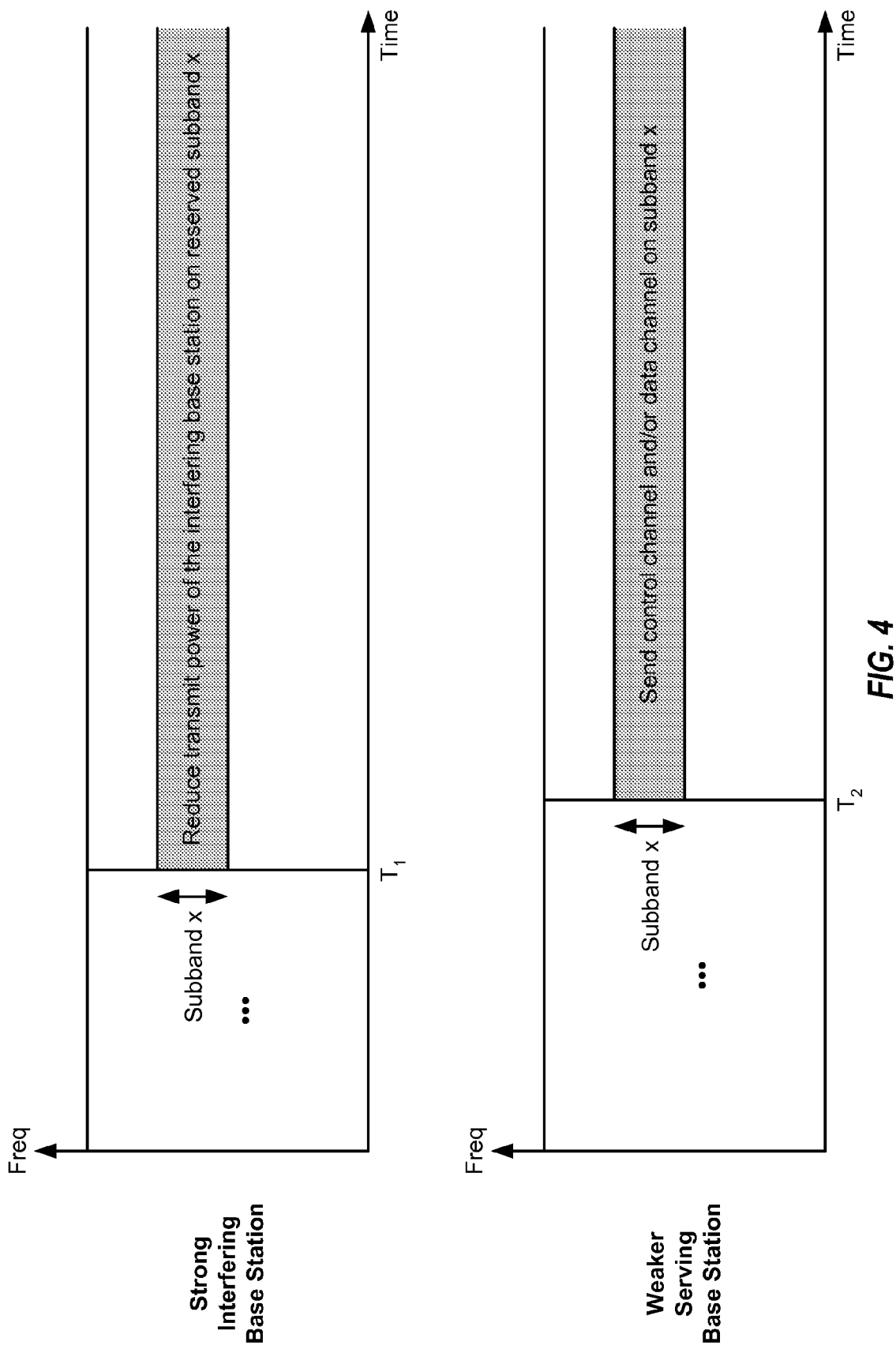
FIG. 4 shows an example of frequency reservation.

FIG. 4 shows a design of frequency reservation to support communication for terminal 110 operating in a dominant interference scenario. In one operating situation, terminal 110 may detect the presence of weaker base station 120 as well as strong base station 122, e.g., based on low reuse pilots or preambles (LRPs) sent by these base stations. LRPs are pilots sent with low reuse so that they can be received by distant terminals. Terminal 110 may desire to connect to weaker base station 120 due to range extension or restricted association. Terminal 110 may inform strong base station 122 of the desire to connect to weaker base station 120.

In another operating situation, terminal 110 may initially communicate with strong base station 122. Terminal 110 may thereafter detect the presence of weaker base station 120 and may desire to connect to this base station based on some criteria such as geometry, pathloss, backhaul quality, etc. Terminal 110 may inform strong base station 122 of the desire to connect to weaker base station 120. In yet another operating situation, terminal 110 may initially communicate with strong base station 122, then detect the presence of weaker base station 120, and then report the weaker base station to the strong base station. Strong base station 122 may select weaker base station 120 to serve terminal 110 based on some criteria and may direct the terminal to perform handoff to the weaker base station.

For all operating situations described above, weaker base station 120 may be a serving base station for terminal 110, and strong base station 122 may be an interfering base station. Interfering base station 122 may reserve some frequency resources on the downlink, or the uplink, or both links to allow terminal 110 to communicate with serving base station 120. The amount of frequency resources to reserve for each link may be negotiated between base stations 120 and 122, e.g., through messages exchanged via the backhaul or through terminal 110. The reserved frequency resources may be given in units of subbands, subcarriers, carriers, etc. The reserved frequency resources may be valid for a predetermined amount of time (e.g., 100 ms) or may be persistent and valid indefinitely until a change is made. Interfering base station 122 may inform serving base station 120 of the reserved frequency resources via the backhaul or through terminal 110.

The amount of frequency resources to reserve for each of the downlink and uplink may be determined in various manners and based on various factors. In one design, the amount of frequency resources to reserve may be determined based on factors such as loading of serving base station 120, loading of interfering base station 122, the amount of data to send for terminal 110, the amount of improvement in network capacity, etc. In one design, a fixed amount of frequency resources may be reserved. In another design, a configurable amount of frequency resources may be reserved and may vary over time and/or from base station to base station. In the example shown in FIG. 4, interfering base station 122 reserves subband x for serving base station 120. The particular frequency resources to reserve may be determined as described below.

Figure 5:
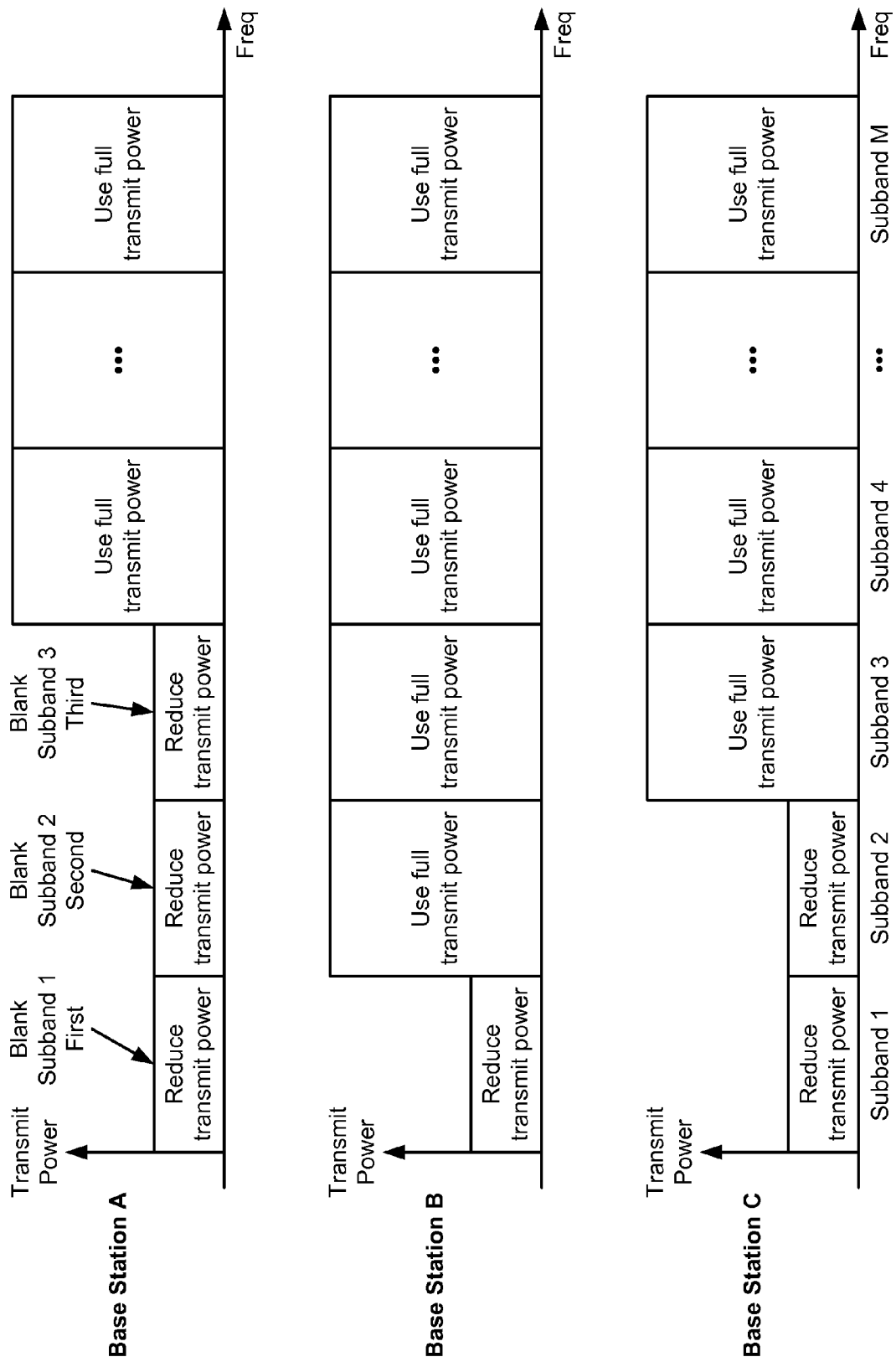
FIG. 5 shows reservation of frequency resources in a predetermined order.

FIG. 5 shows a design of reserving frequency resources in a predetermined order. In the example shown in FIG. 5, three base stations A, B and C reserve frequency resources in units of subband. The horizontal axis for each base station denotes frequency, and the vertical axis denotes transmit power. Terminal 110 may observe high interference from base stations A, B and C. If these interfering base stations reserve different subbands, then terminal 110 may still observe high interference on all of the reserved subbands. For example, if only base station A reserves subband 1, then terminal 110 may still observe high interference from base station B and/or C on subband 1 and may not be able to communicate on subband 1.

In one design, interfering base stations may reserve frequency resources in a predetermined order. In the example shown in FIG. 5, subband 1 may be reserved or blanked first, then subband 2 may be reserved second, then subband 3 may be reserved third, etc. Base station A may decide to reserve three subbands and may then reserve subbands 1, 2 and 3. Base station B may decide to reserve one subband and may then reserve subband 1. Base station C may decide to reserve two subbands and may then reserve subbands 1 and 2. Terminal 110 would observe less interference on subband 1 from all three base stations A, B and C, may observe less interference on subband 2 from base stations A and C, and would observe less interference on subband 3 from only base station A. Terminal 110 may be able to achieve good SINR on subband 1, moderate SINR on subband 2, and lower SINR on subband 3.

In one design, different base stations of the same power class (e.g., all macro base stations) may reserve frequency resources in a predetermined order. For example, base stations A, B and C in FIG. 5 may be macro base stations. Terminal 110 may desire to connect to a pico base station located within the coverage of all three macro base stations A, B and C and may be able to achieve good SINR on subband 1 reserved by all three macro base stations. The predetermined order of reserving frequency resources may be known a priori by the base stations or may be conveyed to the base stations.

Referring back to the example shown in FIGS. 1 and 4, interfering base station 122 may reduce interference on the reserved downlink frequency resources in various manners. In one design, interfering base station 122 may avoid transmission on the reserved frequency resources and would then cause no interference on these frequency resources. In another design, interfering base station 122 may transmit at a lower power level in order to reduce interference on the reserved frequency resources. In one design, the transmit power level of interfering base station 122 may be selected to achieve a target interference level for terminal 110. Terminal 110 may send a request to reserve frequency resources to interfering base station 122 and may include the target interference level and possibly its transmit power level in the request. Interfering base station 122 may determine the pathloss from terminal 110 to interfering base station 122 based on the known or reported transmit power level of the terminal and the measured received power of the request at the interfering base station. Interfering base station 122 may then determine its transmit power level based on the pathloss and the target interference level. Similarly, interference on reserved uplink frequency resources may be reduced by having terminals served by interfering base station 122 either avoid transmission on these frequency resources or transmit at a lower power level.

Serving base station 120 may use the reserved frequency resources in various manners. In one design, serving base station 120 may send one or more downlink control channels (e.g., exclusively) on reserved downlink frequency resources and/or may receive one or more uplink control channels (e.g., exclusively) on reserved uplink frequency resources. This design may allow serving base station 120 to reliably send control information to terminal 110 and/or reliably receive control information from terminal 110 on frequency resources having less interference. Serving base station 120 may send data on the reserved downlink frequency resources (if available) or on other downlink resources, which may be reserved in other manners. Serving base station 120 may also receive data from terminal 110 on the reserved uplink frequency resources (if available) or on other uplink resources, which may be reserved in other manners. For example, serving base station 120 may send a reduce interference request to ask interfering terminals to reduce interference on certain uplink resources so that terminal 110 can send data on the uplink resources to serving base station 120. Correspondingly, terminal 110 may send a reduce interference request to ask interfering base station 122 to reduce interference on certain downlink resources so that serving base station 120 can send data on the downlink resources to terminal 110. This design may allow interfering base station 122 to reserve a smaller amount of frequency resources on a long-term basis. Uplink and/or downlink resources for sending data may be dynamically reserved, as needed, using reduce interference requests, which may also be referred to as resource utilization messages (RUMs).

In another design, serving base station 120 may send downlink control and data channels on the reserved downlink frequency resources and/or may receive uplink control and data channels on the reserved uplink frequency resources. Interfering base station 122 may reserve a sufficient amount of frequency resources on each link for the control and data channels on that link.

In one design, interfering base station 122 may broadcast information conveying the frequency resources reserved for serving base station 120. In another design, serving base station 120 may broadcast information conveying reserved frequency resources used for control channels. A base station may broadcast information regarding the reserved frequency resources in the LRP or some other signal sent by the base station.

In one design, terminal 110 may periodically send channel information to serving base station 120. The channel information may comprise channel quality indicator (CQI) information, interference information, channel response information, etc. In one design, the CQI information may comprise an SINR estimate for each frequency unit to be reported, e.g., each subband reserved for serving base station 120, each subband that might be used for data transmission to terminal 110, each subband with sufficiently high SINR, each subband with sufficiently low interference, all frequency resources reserved for serving base station 120, the entire system bandwidth, etc. In another design, the CQI information may comprise at least one modulation and coding scheme (MCS) determined based on at least one SINR estimate. The interference information may comprise an interference estimate for each frequency unit to be reported. The frequency unit(s) for CQI reporting may be the same as or different from the frequency unit(s) for interference reporting. Terminal 110 may send the CQI information at a first rate and may send the interference information at a second rate, which may be the same as or slower than the first rate. Alternatively or additionally, terminal 110 may send the CQI information and/or the interference information whenever requested by serving base station 120, whenever the channel conditions change, or based on other triggering events. Serving base station 120 may use the CQI information and/or the interference information reported by terminal 110 to select the terminal for data transmission, to select frequency resources to use for data transmission to the terminal, to select a modulation and coding scheme for data transmission to the terminal, etc.

Terminal 110 may observe excessively high interference from interfering base station 122 and may be desensitized (or desensed) by the interfering base station on the downlink. Desens may occur when the interference is so high that a desired signal from serving base station 120 cannot be detected by terminal 110 in the presence of the high interference. For example, terminal 110 may perform automatic gain control (AGC) and may adjust a receiver gain such that an input signal provided to an analog-to-digital converter (ADC) is at a target signal level in order to avoid clipping the ADC. The ADC input signal may include the desired signal from serving base station 120 as well as high interference from interfering base station 122. The ADC input signal may be dominated by the high interference. The desired signal level may be below the quantization noise level of the ADC and may be undetectable.

The desensitization scenario described above may not be addressed by having interfering base station 122 reserve some frequency resources for serving base station 120. If interfering base station 122 reserves some frequency resources but transmits on the unreserved frequency resources, then the high interference from these frequency resources may still cause AGC at terminal 110 to adjust the receiver gain such that the desired signal is below the quantization noise at the ADC input.

In another aspect, desensitization of terminal 110 may be addressed by using time reservation. Time reservation is reservation of certain time resources (e.g., time intervals) by one base station for one or more other base stations. Interfering base station 122 may reserve certain time intervals (e.g., a set of subframes) for serving base station 120 and may transmit at a low power level or not at all during the reserved time intervals. Terminal 110 may then observe low or no interference from interfering base station 122 during the reserved time intervals and may be able to detect the desired signal from serving base station 120 during these time intervals.

Figure 6:
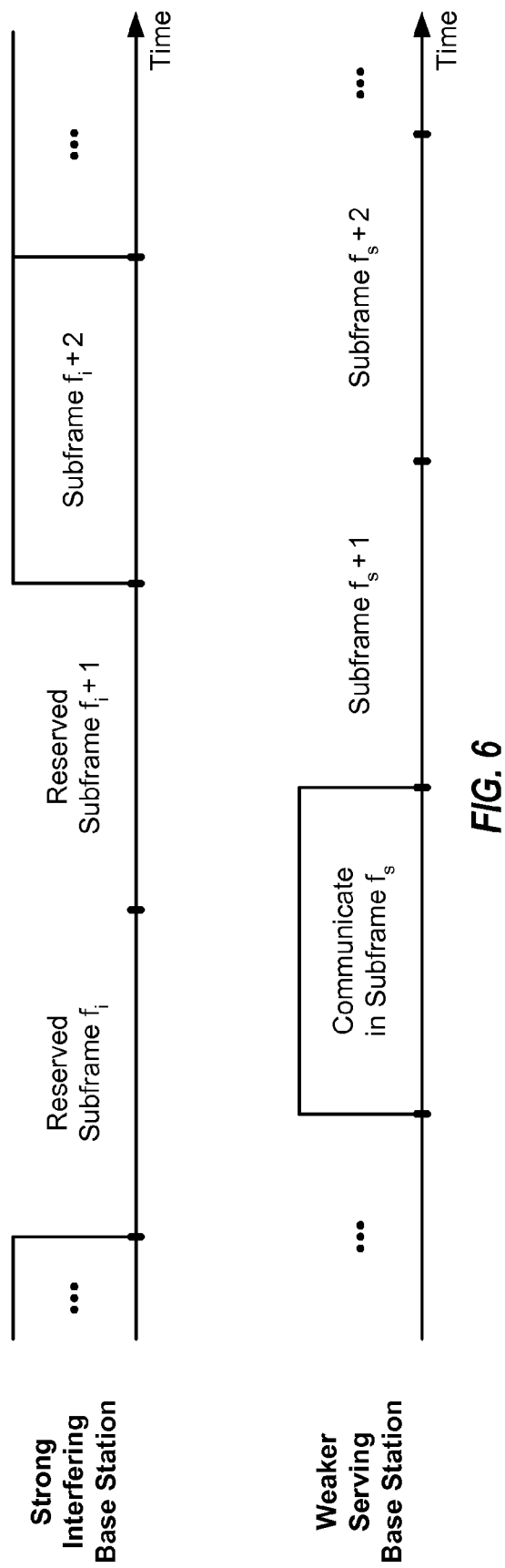
FIG. 6 shows an example of time reservation.

FIG. 6 shows an example of time reservation to combat desensitization of terminal 110 with asynchronous operation by serving base station 120 and interfering base station 122. For each base station, the horizontal axis may represent time, and the vertical axis may represent frequency or transmit power. Serving base station 120 may desire to serve terminal 110 in subframe $f_s$. Because of asynchronous operation, subframe $f_s$ of serving base station 120 may overlap subframes $f_i$ and $f_i+1$ of interfering base station 122. Interfering base station 122 may thus reserve all frequency resources in subframes $f_i$ and $f_i+1$ for serving base station 120.

FIG. 6 shows reservation of two subframes by interfering base station 122 to allow serving base station 120 to use one subframe with no or low interference from interfering base station 122. In general, any amount of time (e.g., any number of subframes) may be reserved for serving base station 120. The reserved time may be continuous (e.g., some number of consecutive subframes), which may reduce the percentage of unused time due to non-aligned frame timing of base stations 120 and 122. The reserved time may also be spaced apart. For example, Q interlaces may be defined, with each interlace including subframes that are spaced apart by Q subframes, where Q may be equal to 4, 6, 8, etc. Interfering base station 122 may reserve one or more interlaces for serving base station 120. The amount of time to reserve and/or the specific time interval(s) to reserve may be negotiated by base stations 120 and 122, e.g., through messages exchanged via the backhaul or through terminal 110.

Terminal 110 may be desensed by interfering base station 122 on the downlink and may, in turn, desens interfering base station 122 on the uplink. This may be the case, e.g., if interfering base station 122 is a nearby femto base station that terminal 110 cannot access due to restricted association. In such a symmetric desens scenario, interfering base station 122 may reserve some time on the downlink for transmission by serving base station 120 to terminal 110 (e.g., as shown in FIG. 6) and may also reserve some time on the uplink for transmission by terminal 110 to serving base station 120. Interfering base station 122 may avoid scheduling its terminals for uplink transmission during the reserved time for the uplink in order to avoid high interference from terminal 110.

In the examples shown in FIGS. 4 and 6, only interfering base station 122 reserves frequency resources and time for serving base station 120. In general, any base station may reserve frequency resources and/or time for other base stations. Multiple base stations may mutually observe high interference from one another. For frequency reservation, different base stations may use different frequency resources, e.g., different subbands. For time reservation, different base stations may use different time intervals (e.g., different 100 ms intervals) or non-overlapping interlaces.

For clarity, much of the description above has been for interference mitigation on the downlink. The techniques may also be used for interference mitigation on the uplink.

Figure 7:
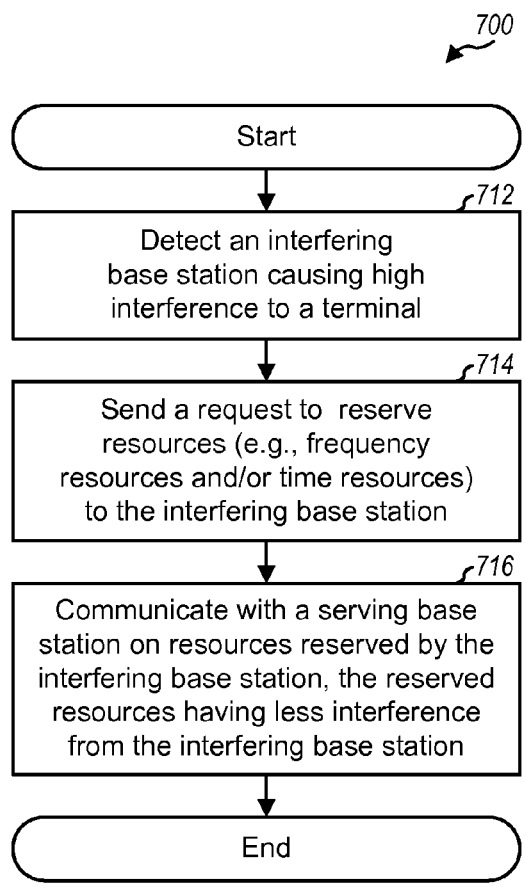
FIG. 7 shows a process performed by a terminal.

FIG. 7 shows a design of a process 700 performed by a terminal for communication with resource reservation in a wireless network. The terminal may detect an interfering base station causing high interference to the terminal (block 712). The terminal may send a request to reserve resources (e.g., frequency resources and/or time resources) to the interfering base station (block 714). The terminal may communicate with a serving base station on resources reserved by the interfering base station (block 716). The serving base station and the interfering base station may be asynchronous and have different frame timing. Alternatively, the serving base station and the interfering base station may be synchronous and have similar frame timing.

In one scenario, the terminal may detect two base stations, select one base station as the serving base station, and identify the other base station as the interfering base station.

In another scenario, the terminal may initially communicate with a first base station (e.g., a macro base station) and then detect a second base station (e.g., a pico base station). The terminal may desire to switch to the second base station and may report the second base station to the first base station. The first base station may decide to handoff the terminal to the second base station and may reserve resources to allow the terminal to communicate with the second base station. The first base station may thus be the serving base station initially and may then become the interfering base station. The serving base station and the interfering base station may also be determined in other manners.

The reserved resources may comprise downlink resources and/or uplink resources. For frequency reservation, the reserved resources for each link (if any) may comprise at least one subband, at least one carrier, a set of subcarriers, etc. For time reservation, the reserved resources for each link (if any) may comprise a set of subframes in a reserved time interval. For both frequency and time reservation, the reserved resources may have less interference from the interfering base station, e.g., due to (i) the interfering base station transmitting at a lower power level or not at all on the reserved resources and/or (ii) terminals served by the interfering base station transmitting at a lower power level or not at all on the reserved resources.

In one design of block 716, the terminal may receive a control channel and/or a data channel sent exclusively on the reserved resources by the serving base station. The control channel and/or the data channel may be localized to the reserved resources with low interference, which may improve performance. In another design, the reserved resources may comprise reserved downlink resources and reserved uplink resources. The terminal may receive a downlink control channel and/or a downlink data channel on the reserved downlink resources from the serving base station. The terminal may send an uplink control channel and/or an uplink data channel on the reserved uplink resources to the serving base station. The reserved resources may also be used for communication in other manners.

For time reservation, the terminal may receive a control channel and/or a data channel from the serving base station during N subframes of the serving base station, where N may be one or greater. The reserved resources may include at least N subframes of the interfering base station that overlap the N subframes of the serving base station, e.g., as shown in FIG. 6. The reserved resources may also comprise one or more interlaces.

In one design, the terminal may determine channel information for the reserved resources and may send the channel information to the serving base station. The terminal may obtain at least one SINR estimate for the reserved resources and may determine CQI information based on the at least one SINR estimate. The terminal may also obtain at least one interference estimate for the reserved resources. The channel information may comprise the CQI information, the at least one interference estimate, and/or other information.

In one design, for range extension, the received power of the serving base station may be weaker than the received power of the interfering base station at the terminal. The pathloss from the serving base station to the terminal may also be smaller than the pathloss from the interfering base station to the terminal. The interfering base station may be a macro base station having a high transmit power level, e.g., 20 Watts. The serving base station may be a pico base station or a femto base station having a low transmit power level, e.g., 1 Watt. In another design, for restricted association, the interfering base station may be a femto base station with restricted access and may be inaccessible by the terminal. The serving base station may be a pico base station or a macro base station with unrestricted access and may be accessible by the terminal.

Figure 8:
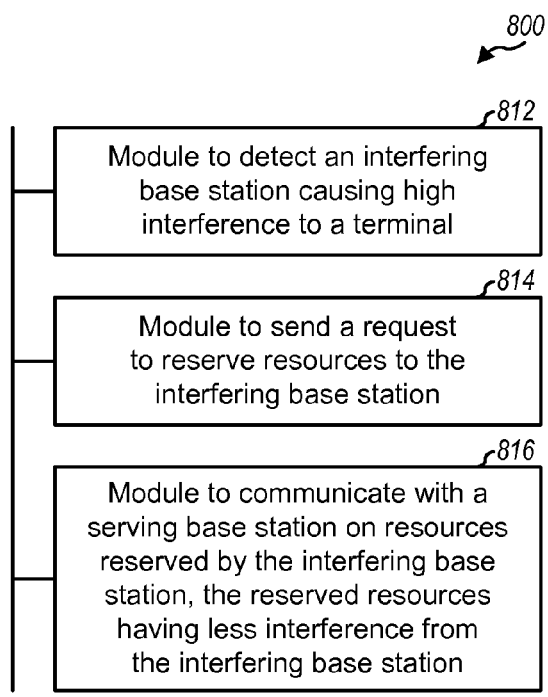
FIG. 8 shows an apparatus for a terminal.

FIG. 8 shows a design of an apparatus 800 for a terminal. Apparatus 800 includes a module 812 to detect an interfering base station causing high interference to the terminal, a module 814 to send a request to reserve resources to the interfering base station, and a module 816 to communicate with a serving base station on resources reserved by the interfering base station, with the reserved resources having less interference from the interfering base station.

FIG. 9 shows a design of a process 900 performed by an interfering base station in a wireless network. The interfering base station may obtain an indication of a terminal observing high interference from the interfering base station and communicating with a serving base station (block 912). The interfering base station and the serving base station may be asynchronous and may have different frame timing. In one design, the interfering base station may receive a request to reserve resources (e.g., frequency resources and/or time resources) from the terminal. In another design, the interfering base station may receive a pilot report from the terminal. The interfering base station may determine that the terminal is observing high interference from the interfering base station based on the request, the pilot report, or some other information.

The interfering base station may reserve resources to facilitate communication between the serving base station and the terminal (block 914). In one design, the interfering base station may reserve resources (e.g., frequency resources) based on a predetermined order (e.g., a shown in FIG. 5). The interfering base station may also reserve resources for a predetermined time period or for a persistent time period until the reserved resources are revoked.

The interfering base station may reduce interference on the reserved resources (block 916). In one design, the interfering base station may avoid transmitting on the reserved resources. In another design, the interfering base station may reduce its transmit power on the reserved resources, e.g., to obtain a target interference level for the terminal. The amount of transmit power reduction may be determined based on an estimated pathloss from the interfering base station to the terminal and the target interference level.

FIG. 10 shows a design of an apparatus 1000 for an interfering base station. Apparatus 1000 includes a module 1012 to obtain an indication of a terminal observing high interference from the interfering base station and communicating with a serving base station, a module 1014 to reserve resources to facilitate communication between the serving base station and the terminal, and a module 1016 to reduce interference on the reserved resources by the interfering base station.

FIG. 11 shows a design of a process 1100 performed by a serving base station in a wireless network. The serving base station may determine resources (e.g., frequency resources and/or time resources) reserved by an interfering base station (block 1112). The interfering base station and the serving base station may be asynchronous and may have different frame timing. The reserved resources may have less interference from the interfering base station. The serving base station may broadcast information indicative of the reserved resources, e.g., via system information or an LRP.

The serving base station may communicate with a terminal on the reserved resources (block 1114). In one design, the serving base station may send a control channel and/or a data channel (e.g., exclusively) on the reserved resources to the terminal. In another design, the serving base station may send the control channel and/or the data channel on the reserved resources as well as other resources to the terminal. In yet another design, the reserved resources may comprise reserved downlink resources and reserved uplink resources. The serving base station may send a downlink control channel and/or a downlink data channel on the reserved downlink resources to the terminal. The serving base station may receive an uplink control channel and/or an uplink data channel on the reserved uplink resources from the terminal.

In one design, the serving base station may receive channel information (e.g., CQI information, interference information, etc.) for the reserved resources from the terminal. The serving base station may use the channel information to select the terminal for data transmission, to select resources to use for the data transmission, to select a modulation and coding scheme for the data transmission, etc.

FIG. 12 shows a design of an apparatus 1200 for a serving base station. Apparatus 1200 includes a module 1212 to determine resources reserved by an interfering base station, with the reserved resources having less interference from the interfering base station, and a module 1212 to communicate with a terminal on the reserved resources.

FIG. 13 shows a design of a process 1300 performed by a serving base station for communication with resource reservation in a wireless network. The serving base station may detect high interference (block 1312). The serving base station may determine reserved resources (e.g., frequency resources and/or time resources) having less interference from at least one interfering terminal (block 1314). In one design, the serving base station may send to a neighbor base station a request to reserve resources. The neighbor base station may then direct the at least one interfering terminal to reduce interference on the reserved resources. In another design, the serving base station may send to the at least one interfering terminal a request to reduce interference on the reserved resources. Each interfering terminal may then reduce interference on the reserved resources. In any case, the serving base station may broadcast information indicative of the reserved resources to its terminals.

The serving base station may communicate with a terminal on the reserved resources (block 1316). In one design, the serving base station may receive a control channel and/or a data channel sent (e.g., exclusively) on the reserved resources by the terminal.

FIG. 14 shows a design of an apparatus 1400 for a serving base station with resource reservation. Apparatus 1400 includes a module 1412 to detect high interference at the serving base station, a module 1414 to determine reserved resources having less interference from at least one interfering terminal, and a module 1416 to communicate with a terminal on the reserved resources.

Figures 15, 16:
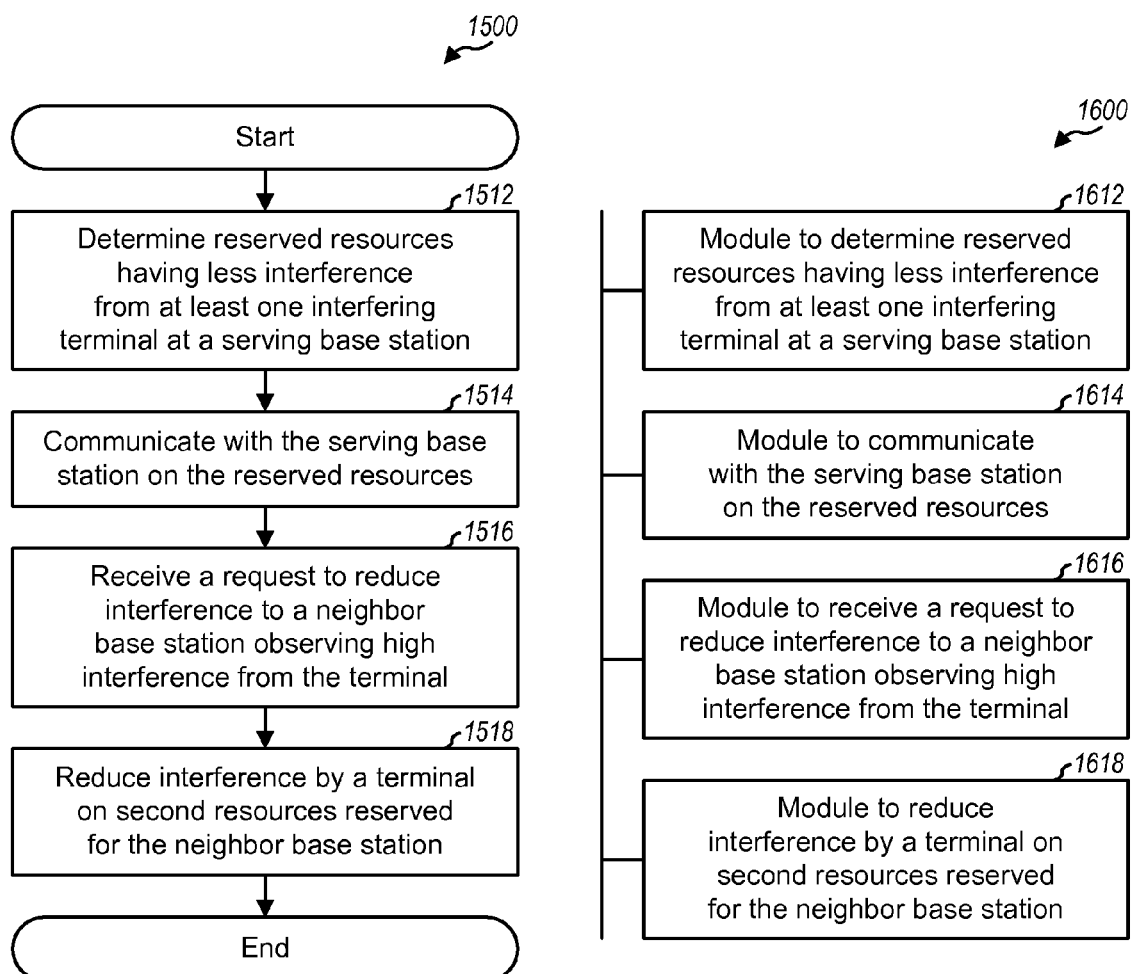
FIG. 15 shows another process performed by a terminal.
FIG. 16 shows another apparatus for a terminal.

FIG. 15 shows a design of a process 1500 performed by a terminal for communication with resource reservation in a wireless network. The terminal may determine reserved resources (e.g., frequency resources and/or time resources) having less interference from at least one interfering terminal at a serving base station (block 1512). In one design, the terminal may receive broadcast information indicative of the reserved resources from the serving base station. The terminal may communicate with the serving base station on the reserved resources (block 1514). In one design, the terminal may send a control channel and/or a data channel (e.g., exclusively) on the reserved resources to the serving base station.

The terminal may also receive a request to reduce interference to a neighbor base station observing high interference from the terminal (block 1516). The terminal may receive the request from the neighbor base station or the serving base station. The terminal may then reduce interference on second resources reserved for the neighbor base station (block 1518).

FIG. 16 shows a design of an apparatus 1600 for a terminal with resource reservation. Apparatus 1600 includes a module 1612 to determine reserved resources having less interference from at least one interfering terminal at a serving base station, a module 1614 to communicate with the serving base station on the reserved resources, a module 1616 to receive a request to reduce interference to a neighbor base station observing high interference from the terminal, and a module 1618 to reduce interference by the terminal on second resources reserved for the neighbor base station.

The modules in FIGS. 8, 10, 12, 14 and 16 may comprise processors, electronics devices, hardware devices, electronics components, logical circuits, memories, software codes, firmware codes, etc., or any combination thereof.

Figure 17:
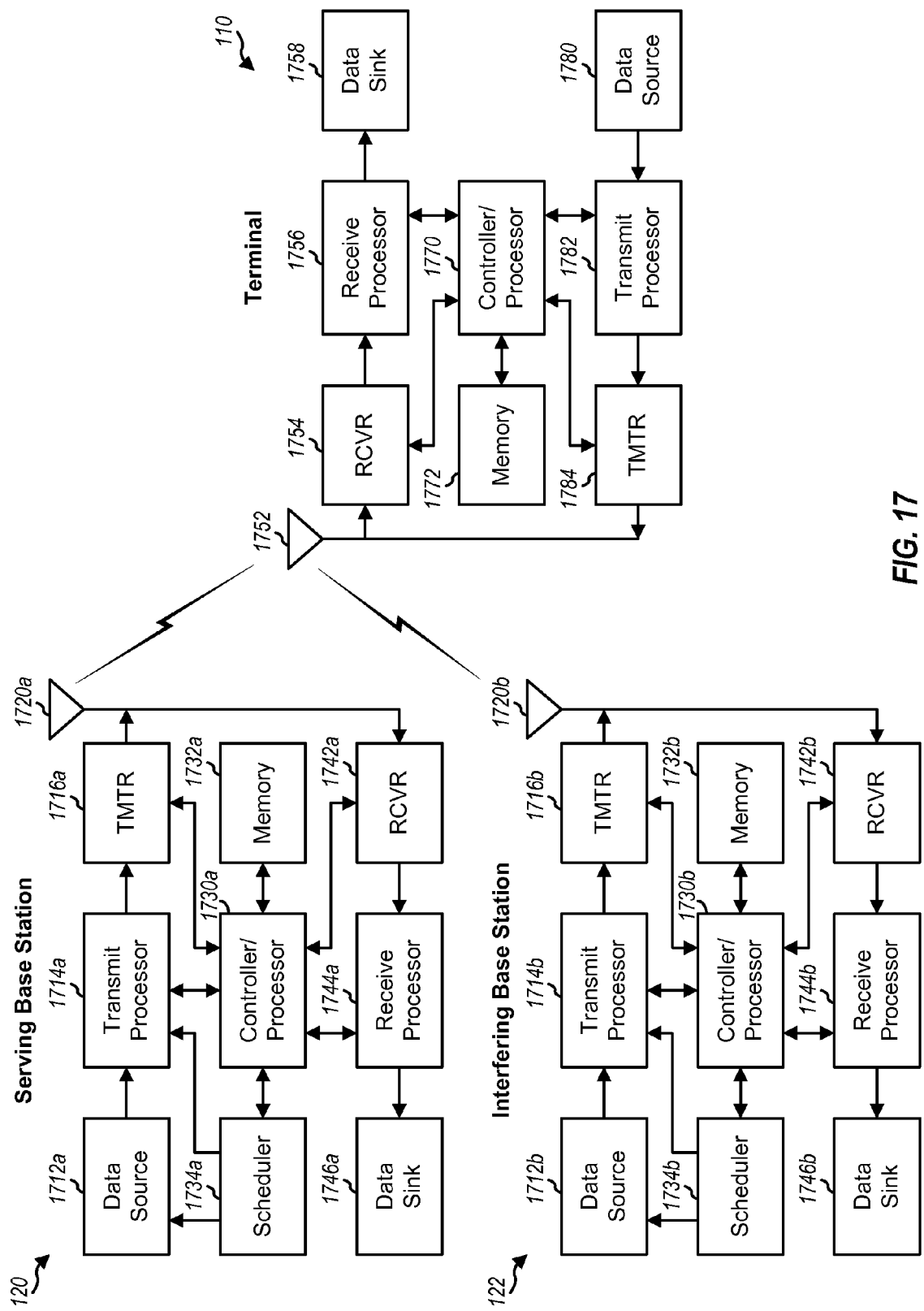
FIG. 17 shows a block diagram of a terminal and two base stations.

FIG. 17 shows a block diagram of a design of terminal 110, serving base station 120, and interfering base station 122. At serving base station 120, a transmit processor 1714a may receive data from a data source 1712a and control information from a controller/processor 1730a and a scheduler 1734a. Controller/processor 1730a may provide messages for reserved resources. Scheduler 1734a may provide scheduling grants for terminal 120. Processor 1714a may process (e.g., encode and modulate) the data and control information and provide data symbols and control symbols, respectively. Processor 1714a may also generate pilot symbols, e.g., for an LRP. Processor 1714a may process the data, control, and pilot symbols (e.g., for OFDM, CDMA, etc.) and provide output samples. A transmitter (TMTR) 1716a may condition (e.g., convert to analog, amplify, filter, and upconvert) the output samples and generate a downlink signal, which may be transmitted via an antenna 1720a.

Interfering base station 122 may similarly process data and control information for the terminals served by base station 122. The data, control information, and pilot may be processed by a transmit processor 1714b, conditioned by a transmitter 1716b, and transmitted via an antenna 1720b.

At terminal 110, an antenna 1752 may receive the downlink signals from base stations 120 and 122. A receiver (RCVR) 1754 may condition (e.g., filter, amplify, downconvert, and digitize) a received signal from antenna 1752 and provide input samples. A receive processor 1756 may process the input samples (e.g., for OFDM, CDMA, etc.) and provide detected symbols. Processor 1756 may further process (e.g., demodulate and decode) the detected symbols, provide decoded data to a data sink 1758, and provide decoded control information to a controller/processor 1770.

On the uplink, a transmit processor 1782 may receive and process data from a data source 1780 and control information (e.g., requests for reserved resources) from controller/processor 1770 and provide output samples. A transmitter 1784 may condition the output samples and generate an uplink signal, which may be transmitted via antenna 1752. At each base station, the uplink signals from terminal 110 and other terminals may be received by antenna 1720, conditioned by a receiver 1742, and processed by a receive processor 1744. Processor 1744 may provide decoded data to a data sink 1746 and decoded control information to controller/processor 1730.

Controllers/processors 1730a, 1730b and 1770 may direct the operation at base stations 120 and 122 and terminal 110, respectively. Processor 1770 and/or other modules at terminal 110 may perform or direct process 700 in FIG. 7, process 1500 in FIG. 15, and/or other processes for the techniques described herein. Processor 1730b and/or other modules at interfering base station 122 may perform or direct process 900 in FIG. 9 and/or other processes for the techniques described herein. Processor 1730a and/or other modules at serving base station 120 may perform or direct process 1100 in FIG. 11, process 1300 in FIG. 13, and/or other processes for the techniques described herein. Memories 1732a, 1732b and 1772 may store data and program codes for base stations 120 and 122 and terminal 110, respectively. Schedulers 1734a and 1734b may schedule terminals for communication with base stations 120 and 122, respectively, and may assign resources to the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication at a terminal, comprising:
    detecting, by the terminal, an interfering base station causing interference to the terminal based, at least in part, on transmissions from the interfering base station;
    sending, by the terminal, a request to reserve, for a predetermined time period, time frequency resources based on detecting the interfering base station; and
    communicating, by the terminal, with a serving base station during the predetermined time period and on the time frequency resources reserved by the interfering base station based at least in part on the request and a predetermined order for reserving resources, wherein the interfering base station limits transmission on the reserved time frequency resources during the predetermined time period to reduce interference.

2. The method of claim 1, wherein sending the request comprises transmitting a pilot report, and
    wherein the reserved time frequency resources are determined based on the report.

3. The method of claim 1, wherein the reserved time frequency resources comprise at least one subband, or at least one carrier, or a set of subcarriers.

4. The method of claim 1, wherein the interfering base station and the serving base station are asynchronous and have different frame timing.

5. The method of claim 1, wherein the communicating with the serving base station comprises receiving at least one of a control channel and a data channel sent exclusively on the reserved time frequency resources by the serving base station.

6. The method of claim 1, wherein the reserved time frequency resources comprise reserved downlink resources and reserved uplink resources, and wherein the communicating with the serving base station comprises
receiving at least one of a downlink control channel and a downlink data channel on the reserved downlink resources from the serving base station, and
sending at least one of an uplink control channel and an uplink data channel on the reserved uplink resources to the serving base station.

7. The method of claim 1, further comprising:
receiving at least one of a control channel and a data channel from the serving base station during N subframes of the serving base station, where N is one or greater, and wherein the reserved time frequency resources comprise at least N subframes of the interfering base station covering the N subframes of the serving base station.

8. The method of claim 1, further comprising:
determining channel information for the reserved time frequency resources; and
sending the channel information to the serving base station.

9. The method of claim 8, wherein the determining channel information comprises:
obtaining at least one signal-to-noise-and-interference ratio (SINR) estimate for the reserved time frequency resources, and
determining channel quality indicator (CQI) information based on the at least one SINR estimate, and wherein the channel information comprises the CQI information.

10. The method of claim 8, wherein the determining channel information comprises obtaining at least one interference estimate for the reserved time frequency resources, and wherein the channel information comprises the at least one interference estimate.

11. The method of claim 1, wherein received power of the serving base station is weaker than received power of the interfering base station at the terminal, and wherein pathloss from the serving base station to the terminal is smaller than pathloss from the interfering base station to the terminal.

12. The method of claim 1, wherein the interfering base station is a macro base station having a high transmit power level, and wherein the serving base station is a pico base station or a femto base station having a low transmit power level.

13. The method of claim 1, wherein the interfering base station is a femto base station with restricted access, and wherein the serving base station is a pico base station or a macro base station with unrestricted access.

14. The method of claim 1, further comprising:
detecting at least one of the serving base station and the interfering base station based on a low reuse preamble sent by each base station.

15. An apparatus for wireless communication, comprising:
means for detecting, by a terminal, an interfering base station causing interference to the terminal based, at least in part, on transmissions from the interfering base station;
means for sending, by the terminal, a request to reserve, for a predetermined time period, time frequency resources based on detecting the interfering base station; and
means for communicating, by the terminal, with a serving base station during the predetermined time period on the time frequency resources reserved by the interfering base station, wherein the reserved time frequency resources are reserved by the interfering base station based at least in part on the request and a predetermined order for reserving resources, and the interfering base station limits transmission on the reserved time frequency resources to reduce interference.

16. The apparatus of claim 15, wherein the means for communicating with the serving base station comprises means for receiving at least one of a control channel and a data channel sent exclusively on the reserved time frequency resources by the serving base station.

17. The apparatus of claim 15, further comprising:
means for determining channel information for the reserved time frequency resources; and
means for sending the channel information to the serving base station.

18. An apparatus for wireless communication, comprising:
at least one processor configured to detect, by a terminal, an interfering base station causing interference to the terminal, to send, by the terminal, a request to reserve, for a predetermined time period, time frequency resources based on detecting the interfering base station, and to communicate, by the terminal, with a serving base station during the predetermined time period and on the time frequency resources reserved by the interfering base station, wherein the reserved time frequency resources are reserved by the interfering base station based at least in part on the request and a predetermined order for reserving resources, wherein the interfering base station limits transmission on the reserved time frequency resources to reduce interference.

19. The apparatus of claim 18, wherein the at least one processor is configured to receive at least one of a control channel and a data channel sent exclusively on the reserved time frequency resources by the serving base station.

20. The apparatus of claim 18, wherein the at least one processor is configured to determine channel information for the reserved time frequency resources, and to send the channel information to the serving base station.

21. A non-transitory computer-readable medium comprising:
code for causing at least one computer to detect, by a terminal, an interfering base station causing interference to the terminal;
code for causing the at least one computer to send, by the terminal, a request to reserve, for a predetermined time period, time frequency resources based on detecting the interfering base station; and
code for causing the at least one computer to communicate, by the terminal, with a serving base station during the predetermined time period and on the time frequency resources reserved by the interfering base station, wherein the reserved time frequency resources are reserved by the interfering base station based at least in part on the request and a predetermined order for reserving resources, wherein the interfering base station limits transmission on the reserved time frequency resources to reduce interference.

22. A method for wireless communication, comprising:
reserving, at an interfering base station, time frequency resources for a predetermined time period to facilitate communication between a serving base station and a terminal, wherein the time frequency resources are reserved by the interfering base station based at least in part on a request made by the terminal observing interference from the interfering base station and a predetermined order for reserving resources; and
limiting transmission on the reserved time frequency resources during the predetermined time period to reduce interference by the interfering base station.

23. The method of claim 22, wherein the interfering base station and the serving base station are asynchronous and have different frame timing.

24. The method of claim 22, further comprising
receiving the request to reserve time frequency resources from the terminal, and
determining the terminal observing interference from the interfering base station based on the request.

25. The method of claim 24, wherein receiving the request from the terminal observing interference comprises:
receiving a pilot report from the terminal, and
determining the terminal observing interference from the interfering base station based on the pilot report.

26. The method of claim 22, wherein the limiting transmission on the reserved time frequency resources comprises avoiding transmitting on the reserved time frequency resources by the interfering base station during the predetermined time period.

27. The method of claim 22, wherein the limiting transmission on the reserved time frequency resources during the predetermined time period comprises reducing transmit power of the interfering base station on the reserved time frequency resources to obtain a target interference level for the terminal.

28. An apparatus for wireless communication, comprising:
means for reserving, at an interfering base station, time frequency resources for a predetermined time period to facilitate communication between a serving base station and a terminal, wherein the time frequency resources are reserved by the interfering base station based at least in part on a request made by the terminal observing interference from the interfering base station and a predetermined order for reserving resources; and
means for limiting transmission on the reserved time frequency resources during the predetermined time period to reduce interference by the interfering base station.

29. The apparatus of claim 28, further comprising means for receiving the request to reserve time frequency resources from the terminal.

30. The apparatus of claim 28, wherein the means for limiting transmission on the reserved time frequency resources during the predetermined time period comprises means for avoiding transmitting on the reserved time frequency resources by the apparatus.

31. A method for wireless communication by a serving base station, comprising:

sending, by the serving base station, a load information message to an interfering base station via a backhaul, the load information message comprising an interference indicator associated with an interference identified by the serving base;
receiving, at the serving base station, a response message from the interfering base station via the backhaul, the response message comprising information informing the serving base station of time frequency resources reserved for a predetermined time period by the interfering base station, wherein the interfering base station limits transmission on the reserved time frequency resources during the predetermined time period to reduce interference; and
communicating with a terminal on the reserved time frequency resources during the predetermined time period.

32. The method of claim 31, wherein the communicating with the terminal comprises sending at least one of a control channel and a data channel exclusively on the reserved time frequency resources to the terminal.

33. The method of claim 31, wherein the reserved time frequency resources comprise reserved downlink resources and reserved uplink resources, and wherein the communicating with the terminal comprises:
sending at least one of a downlink control channel and a downlink data channel on the reserved downlink resources to the terminal, and
receiving at least one of an uplink control channel and an uplink data channel on the reserved uplink resources from the terminal.

34. The method of claim 31, further comprising:
receiving channel information for the reserved time frequency resources from the terminal; and
using the channel information to select the terminal for data transmission, to select time frequency resources to use for the data transmission, to select a modulation and coding scheme for the data transmission, or a combination thereof.

35. The method of claim 31, further comprising:
broadcasting information indicative of the reserved time frequency resources.

36. An apparatus for wireless communication, comprising:
means for sending, by a serving base station, a load information message to an interfering base station via a backhaul, the load information message comprising an interference indicator associated with an interference identified by the serving base station;
means for receiving, at the serving base station, a response message from the interfering base station via the backhaul, the response message comprising information informing the serving base station of time frequency resources reserved for a predetermined time period by the interfering base station, wherein the interfering base station limits transmission on the reserved time frequency resources during the predetermined time period to reduce interference; and
means for communicating with a terminal on the reserved time frequency resources during the predetermined time period.

37. The apparatus of claim 36, wherein the means for communicating with the terminal comprises means for sending at least one of a control channel and a data channel exclusively on the reserved time frequency resources to the terminal.

38. The apparatus of claim 36, further comprising:
means for receiving channel information for the reserved time frequency resources from the terminal; and
means for using the channel information to select the terminal for data transmission, to select time frequency resources to use for the data transmission, to select a modulation and coding scheme for the data transmission, or a combination thereof.

39. A method for wireless communication at a serving base station, comprising:
detecting, by the serving base station, at least one interfering terminal causing interference at the serving base station;
sending, by the serving base station via a backhaul, a load information message to a neighbor base station, the load information message comprising an interference indicator based on the detecting the at least one interfering terminal;
receiving, at the serving base station, a response from the neighbor base station via the backhaul, the response comprising information informing the serving base station of time frequency resources reserved for a predetermined time period by the neighbor base station, wherein the at least one interfering terminal limits transmission on the reserved time frequency resources during the predetermined time period to reduce interference;
broadcasting information indicative of the reserved time frequency resources; and
communicating with a terminal on the reserved time frequency resources.

40. The method of claim 39, further comprising:
sending a request to reduce interference on the reserved time frequency resources to the at least one interfering terminal.

41. The method of claim 39, wherein the communicating with the terminal comprises receiving at least one of a control channel and a data channel sent exclusively on the reserved time frequency resources by the terminal.

42. A method for wireless communication at a terminal, comprising:
determining, at the terminal, time frequency resources reserved by a neighbor base station for a predetermined time period, wherein the time frequency resources are reserved by the neighbor base station based at least in part on a predetermined order for reserving resources, and at least one interfering terminal limits transmission on the reserved time frequency resources during the predetermined time period to reduce interference at a serving base station; and
communicating, by the terminal, with the serving base station on the reserved time frequency resources.

43. The method of claim 42, wherein the communicating with the serving base station comprises sending at least one of a control channel and a data channel exclusively on the reserved time frequency resources to the serving base station.

44. The method of claim 42, further comprising:
receiving a request to reduce interference to the neighbor base station observing interference from the terminal; and
reducing interference by the terminal on second resources reserved for the neighbor base station.

45. The method of claim 44, wherein the receiving the request comprises receiving the request to reduce interference from the neighbor base station or the serving base station.

* * * * *